United States Patent
Ogino et al.

(10) Patent No.: US 10,340,754 B2
(45) Date of Patent: Jul. 2, 2019

(54) ROTATING ELECTRICAL MACHINE AND METHOD OF MANUFACTURING ROTATING ELECTRICAL MACHINE

(71) Applicant: Mitsubishi Electric Corporation, Chiyoda-ku (JP)

(72) Inventors: Ken Ogino, Tokyo (JP); Masahiro Yuya, Tokyo (JP); Tatsuya Kitano, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/760,260

(22) PCT Filed: Nov. 25, 2015

(86) PCT No.: PCT/JP2015/083125
§ 371 (c)(1),
(2) Date: Mar. 15, 2018

(87) PCT Pub. No.: WO2017/090137
PCT Pub. Date: Jun. 1, 2017

(65) Prior Publication Data
US 2018/0269731 A1    Sep. 20, 2018

(51) Int. Cl.
*H02K 1/00*    (2006.01)
*H02K 1/18*    (2006.01)
(Continued)

(52) U.S. Cl.
CPC ............. *H02K 1/18* (2013.01); *H02K 1/148* (2013.01); *H02K 1/17* (2013.01); *H02K 1/265* (2013.01);
(Continued)

(58) Field of Classification Search
CPC ........... H02K 1/17; H02K 1/18; H02K 1/265; H02K 1/148
(Continued)

(56) References Cited

U.S. PATENT DOCUMENTS 3,643,117 A * 2/1972 Alger ..................... H02K 33/04
310/17
6,249,072 B1   6/2001 Sakagami et al.
(Continued)

FOREIGN PATENT DOCUMENTS

CN      100392944 C    6/2008
DE      1 218 599 A    6/1966
(Continued)

OTHER PUBLICATIONS

Combined Office Action and Search Report dated Nov. 5, 2018 in Chinese Patent Application No. 201580084692.5.
(Continued)

*Primary Examiner* — Hanh N Nguyen
(74) *Attorney, Agent, or Firm* — Oblon, McClelland, Maier & Neustadt, L.L.P.

(57) ABSTRACT

A rotating electrical machine includes a stator core including a plurality of stacked electromagnetic steel sheets, the stator core includes a core back and a tooth protruding from the core back, the tooth includes: plural first welded portions arranged on a first lateral face of the tooth with respect to a plane extending in a stacking direction of the electromagnetic steel sheets and equally dividing the width of the tooth, the first welded portions being arranged in the stacking direction; and plural second welded portions arranged on a second lateral face of the tooth with respect to the plane extending in the stacking direction, the second welded portions being arranged in the stacking direction, and the
(Continued)

first welded portions and the second welded portions are staggered in the stacking direction.

11 Claims, 7 Drawing Sheets

(51) Int. Cl.
*H02K 1/14* (2006.01)
*H02K 15/02* (2006.01)
*H02K 1/17* (2006.01)
*H02K 1/26* (2006.01)
*H02K 15/12* (2006.01)

(52) U.S. Cl.
CPC ........... *H02K 15/02* (2013.01); *H02K 15/024* (2013.01); *H02K 15/12* (2013.01); *H02K 2213/12* (2013.01)

(58) Field of Classification Search
USPC ................ 310/216.001–216.137; 29/596
See application file for complete search history.

(56) References Cited

U.S. PATENT DOCUMENTS

| | | | |
|---|---|---|---|
| 6,262,511 B1 * | 7/2001 | Ohashi | .................... H02K 1/16 29/516 |
| 6,448,682 B2 | 9/2002 | Sakagami et al. | |
| 6,477,761 B1 | 11/2002 | Ohashi et al. | |
| 2001/0015589 A1 | 8/2001 | Sakagami et al. | |
| 2002/0140315 A1 * | 10/2002 | Harada | .................... H02K 1/16 310/254.1 |
| 2004/0239190 A1 | 12/2004 | Rau et al. | |
| 2006/0125341 A1 | 6/2006 | Rau et al. | |
| 2008/0111443 A1 | 5/2008 | Okamoto et al. | |
| 2016/0352176 A1 | 12/2016 | Tokizaki et al. | |

FOREIGN PATENT DOCUMENTS

| | | |
|---|---|---|
| DE | 102 43 985 A1 | 4/2004 |
| DE | 102 43 986 A1 | 4/2004 |
| DE | 10 2007 012 323 A1 | 5/2008 |
| JP | 62-250845 A | 10/1987 |
| JP | 07-007876 A | 1/1995 |
| JP | 09-219941 A | 8/1997 |
| JP | 2000-295800 A | 10/2000 |
| JP | 2000-333388 A | 11/2000 |
| JP | 2008-125243 A | 5/2008 |
| JP | 2010-207073 A | 9/2010 |
| JP | 2011-217454 A | 10/2011 |
| JP | 5213821 B2 | 6/2013 |
| JP | 2015-171179 A | 9/2015 |

OTHER PUBLICATIONS

International Search Report dated Feb. 16, 2016 in PCT/JP2015/083125, filed on Nov. 25, 2015.
Office Action dated Jun. 21, 2018 in German Patent Application No. 11 2015 006 899.6.
Korean Office Action dated Jul. 5, 2018 in Korean Patent Application No. 10-2018-7013462 (with English translation).

* cited by examiner

ROTATING ELECTRICAL MACHINE AND METHOD OF MANUFACTURING ROTATING ELECTRICAL MACHINE

FIELD

The present invention relates to a rotating electrical machine including a stator and a rotor disposed inside the stator and to a method of manufacturing the rotating electrical machine.

BACKGROUND

A stator core of a rotating electrical machine used for various applications in recent years is formed in a cylindrical shape by stacking a plurality of electromagnetic steel sheets and welding the stacked electromagnetic steel sheets together in the stacking direction. Such a stator core has the advantage that the manufacturing cost of the die is reduced, because the swages are not used in forming the stator core. Since the stator core is formed by welding, unfortunately, the plural electromagnetic steel sheets are electrically continuous with one another through the welded portions. As a result, the magnetic flux flowing from the rotor to the stator core interlinks with the welded portions, and the eddy current flows as the magnetic flux changes with time, which increases the eddy current loss.

Patent Literature 1 discloses that the welds are formed in the staggered fashion on the inner peripheral face of the stator core in the stacking direction of the stator core. The conventional technique of Patent Literature 1, which forms the staggered welds to suppress the influence of the interlinkage magnetic flux, that the eddy current loss, improves the operation efficiency of the rotating electrical machine.

CITATION LIST

Patent Literature

Patent Literature 1: Japanese Patent Application Laid-open No. 2000-333388

SUMMARY

Technical Problem

Since the structure of Patent Literature 1 includes the welded portions on the inner peripheral face of the stator core, unfortunately, the distance between the rotor and the welded portions is short, which poses a concern about the influence of the interlinkage magnetic flux on the welded portions. That is, the plurality of welded portions arranged in the staggered fashion in the stacking direction overlap at portions of the plurality of electromagnetic steel sheets so that the plural electromagnetic steel sheets are separate from one another. Since the magnetic flux flowing from the rotor to the stator core interlinks with these overlapping portions, an eddy current loss due to the eddy current occurs in the overlapping portions, which leads to a reduction in the operation efficiency of the rotating electrical machine.

The present invention has been made in view of the above, and an object thereof is to obtain a rotating electrical machine capable of improving the operation efficiency of the rotating electrical machine.

Solution to Problem

In order to solve the above-mentioned problems and achieve the object, a rotating electrical machine of the present invention comprises a stator core including a plurality of tacked electromagnetic steel sheets, the stator core including a core back and a tooth protruding from the core back. The tooth includes: a plurality of first welded portions arranged on a first lateral face of the tooth and arranged in a stacking direction of the plurality of electromagnetic steel sheets; and a plurality of second welded portions arranged on a second lateral face of the tooth and arranged in the stacking direction. The plurality of first welded portions and the plurality of second welded portions are arranged in a staggered fashion in the stacking direction.

Advantageous Effects of Invention

The rotating electrical machine according to the present invention can achieve the effect of improving the operation efficiency of the rotating electrical machine.

DESCRIPTION OF EMBODIMENTS

Hereinafter, a rotating electrical machine and a method of manufacturing a rotating electrical machine according embodiments of the present invention will be described in detail based on the drawings. The present invention is not limited to the embodiments.

First Embodiment

Figure 1:
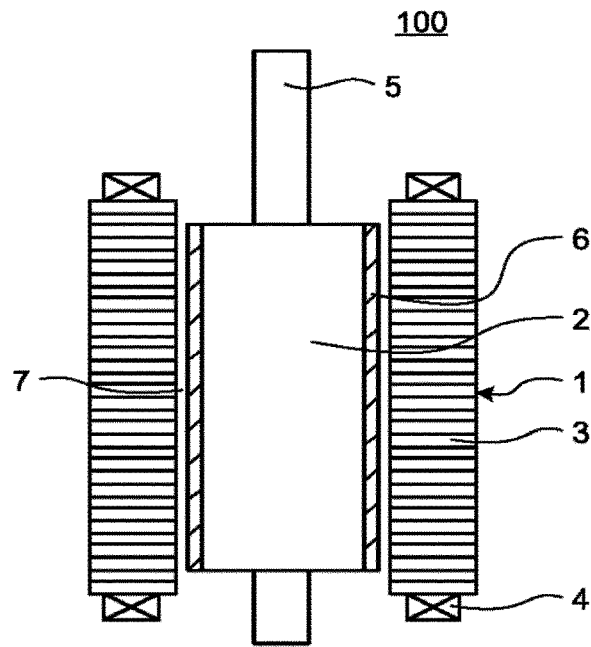
FIG. 1 is a configuration diagram illustrating a rotating electrical machine according to a first embodiment.
Figure 2:
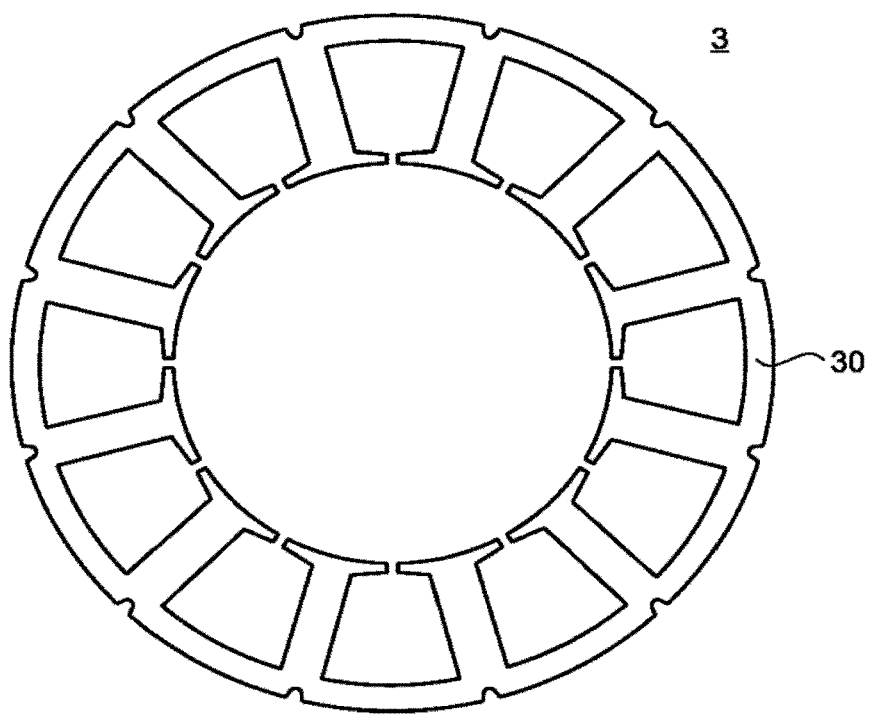
FIG. 2 is a cross-sectional view of a stator core illustrated in FIG. 1.
Figure 3:
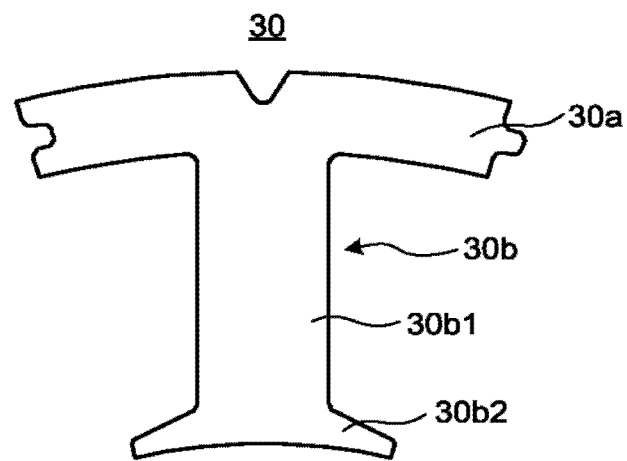
FIG. 3 is an enlarged view of a core piece constituting the stator core illustrated in FIG. 2.

FIG. 1 is a configuration diagram illustrating a rotating electrical machine according to a first embodiment. FIG. 2 is a cross-sectional view of a stator core illustrated in FIG. 1. FIG. 3 is an enlarged view of a core piece constituting the stator core illustrated in FIG. 2.

The rotating electrical machine 100 includes an annular stator 1 and a rotor 2 disposed inside the stator 1.

The stator 1 includes an annular stator core 3 and a winding 4 wound around the stator core 3.

The stator core 3 illustrated in FIG. 2 is formed by arranging a plurality of core pieces 30 illustrated in FIG. 3 in the rotational direction of the rotor 2.

The rotor 2 includes a shaft 5 and a permanent magnet 6 provided on the outer peripheral face of the shaft 5.

A gap 7 is provided between the outer peripheral face of the rotor 2 and the inner peripheral face of the stator core 3. Under the action of the magnetic flux generated in the permanent magnet 6 and the magnetic flux generated in the winding 4, a rotating torque is generated, and the rotor 2 is rotated by this rotating torque.

The core piece 30 is formed by stacking a plurality of electromagnetic steel sheets each obtained by punching a steel sheet base material into a T shape. In the first embodiment, the material of the electromagnetic steel sheet is silicon steel or armco iron. Each of the plurality of electromagnetic steel sheets is coated with an insulating coating, such that when the plurality of electromagnetic steel sheets is stacked, the adjacent electromagnetic steel sheets are insulated from each other.

The core piece includes an arc-like core back 30a and a tooth 30b protruding from the core back 30a.

The tooth 30b includes a tooth base portion 30b1 protruding from the core back 30a and a tooth end portion 30b2 provided at the end of the tooth base portion 30t1.

The circumferential width of the tooth end portion 30b2 is larger than the width of the tooth base portion 30b1. The tooth end portion 30b2 has a flange- or umbrella-shape protruding to opposite sides in the circumferential direction. The circumferential direction is equal to the rotation direction of the rotor illustrated in FIG. 1.

The core piece 30 configured as stated above includes the plurality of electromagnetic steel sheets welded together in the stacking direction. The stacking direction is the direction in which the plurality of electromagnetic steel sheets is stacked.

Figure 4:
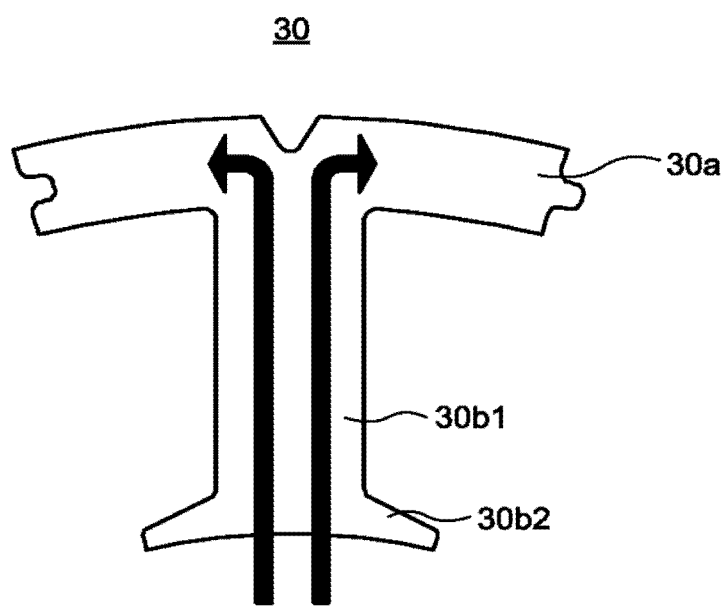
FIG. 4 is a diagram illustrating how the magnetic flux generated in a rotor illustrated in FIG. 1 flows to the core piece.

FIG. 4 is a diagram illustrating how the magnetic flux generated in the rotor illustrated in FIG. 1 flows to the core piece. Arrows indicate paths of flow of the magnetic flux generated in the rotor 2. The magnetic flux generated in the rotor 2 flows from the tooth end portion 30b2 via the tooth base portion 30b1 to the core back 30a, and further flows to the core backs (not illustrated) adjacent thereto in the circumferential direction.

As described above, each of the plurality of electromagnetic steel sheets forming the core piece 30 is coated with the insulating coating. However, when the plural stacked electromagnetic steel sheets are welded together using a welding machine, the welded portions at which the electromagnetic steel sheets are welded together have the insulating coating eliminated. This results in the welded portions being electrically continuous with the plurality of electromagnetic steel sheets.

When the magnetic flux generated in the rotor interlinks with the welded portions, an eddy current flows to the welded portions, and an eddy current loss occurs. In particular, the welded portion which is linearly continuous in the stacking direction of the core piece 30 provides the larger eddy current loss as the length of the welded portion in the stacking direction is larger.

Arranging welded portions in a zigzag alignment, or a staggered fashion in the stacking direction of the core piece 30 is effective in suppressing such an eddy current loss. The staggered fashion means that the welded portions adjacent in a direction orthogonal to the stacking direction are offset from each other in the stacking direction. Since the welded portions are provided in the staggered fashion, each of the welded portions arranged in this fashion has its decreased length in the stacking direction. Consequently, the eddy current flowing to the welded portions is divided in the stacking direction.

As compared with the welded portion that is linearly continuous in the stacking direction of the core piece 30, therefore, the welded portions arranged in the staggered fashion can suppress the eddy current loss and ensure the mechanical strength of the core pieces 30.

Figure 5:
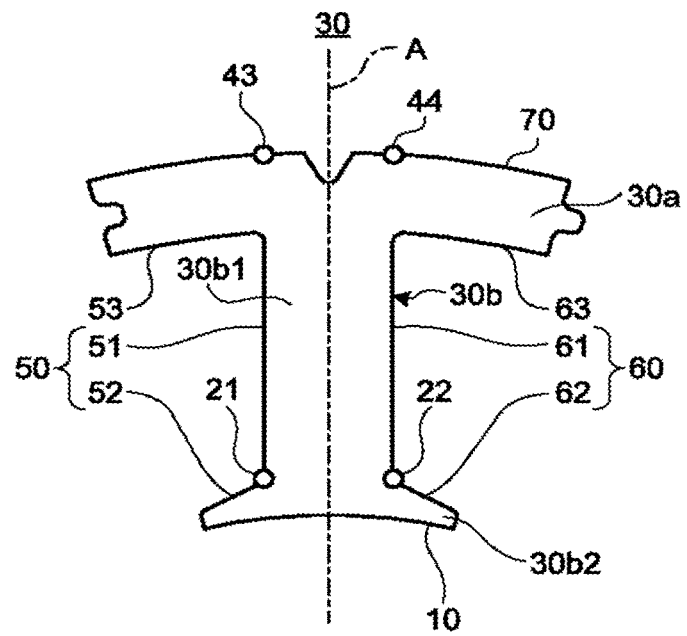
FIG. 5 is a view illustrating the core piece of FIG. having welded portions provided thereon.
Figure 6:
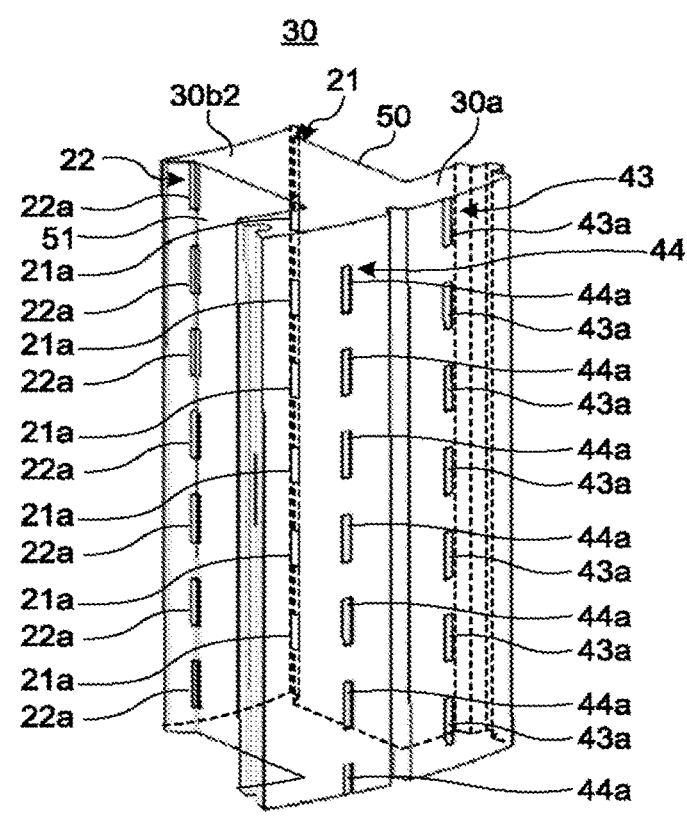
FIG. 6 is a perspective view of the core piece illustrated in FIG. 5.

FIG. 5 is a view illustrating the core piece of FIG. 2 having welded portions provided thereon. FIG. 6 is a perspective view of the core piece illustrated in FIG. 5.

The tooth 30b includes first welded portions 21 and second welded portions 22.

The first welded portions 21 extend in the stacking direction of e electromagnetic steel sheets and are arranged on a first lateral face 50 which is one side of the tooth 30b with respect to plane A. The first welded portions 21 are arranged at intervals in the stacking direction.

Plane A is an imaginary line extending in the direction of protrusion of the tooth 30b, and equally dividing the circumferential width of the tooth base portion 30b1.

The first lateral face 50 includes a lateral face 51 of the tooth base portion 30b1 and a lateral face 52 of the tooth end portion 30b2 that does not include an end face 10 of the tooth 30b.

In the illustrated example, the first welded portions 21 are arranged at the boundary between the lateral face 51 and the lateral face 52.

The second welded portions 22 extend in the stacking direction of the electromagnetic steel sheets and are arranged on a second lateral face 60 which is the other side of the tooth 30b with respect to plane A. The second welded portions 22 are arranged at intervals in the stacking direction.

The second lateral face 60 includes a lateral face 61 of the tooth base portion 30b1 and a lateral face 62 of the tooth end portion 30b2 that does not include the end face 10 of the tooth 30b.

In the illustrated example, the second welded portions 22 are arranged at the boundary between the lateral face 61 and the lateral face 62.

The first welded portions 21 and the second welded portions 22 are arranged in the staggered fashion in the stacking direction as illustrated in FIG. 6. That is, the core piece 30 has the first welded portions 21 and the second welded portions 22 welded in the staggered fashion on the other parts of the tooth 30b than the end face 10.

The core back 30a includes third welded portions 43 and fourth welded portions 44 arranged on an outer side face 70 of the core back 30a. The outer side face 70 of the core back 30a corresponds to the outer peripheral face of the stator core 3 illustrated in FIG. 2.

The third welded portions 43 are arranged on the same side as the first lateral face 50 with respect to plane A and arranged at intervals in the stacking direction.

The fourth welded portions 44 are arranged on the same side as the second lateral face 60 with respect to plane A and arranged at intervals in the stacking direction.

As illustrated in FIG. 6, the third welded portions 43 and the fourth welded portions 44 are arranged in a staggered fashion in the stacking direction.

The first welded portions 21 and the second welded portions 22, which are the welds formed on the other portions of the tooth 30*b* than the end face 10, are distant from the rotor 2 by a large distance, as compared with welds formed on the end face 10 of the tooth 30*b*. Consequently, the first welded portions 21 and the second welded portions 22 are less likely to be affected by the interlinkage magnetic flux generated in the rotor 2, and thus the eddy current loss is suppressed. As a result, the operation efficiency of the rotating electrical machine 100 can be improved.

If the staggered welds are formed on the tooth end face of the stator core and non-staggered planar welds are formed on the outer peripheral face of the core back, the welded area on the tooth end face differs from the welded area on the outer peripheral face of the core back. As a result, a difference in the amount of deformation due to the welding strain during the welding process occurs between the tooth end face and the outer peripheral face of the core back. Consequently, cogging torque pulsation occurs due to a decrease in the dimensional accuracy of the tooth end side in the stacking direction.

For the core piece 30 of the rotating electrical machine 100 according to the first embodiment, the first welded portions 21 and the second welded portions 22 are arranged in the staggered fashion and the third welded portions 43 and the fourth welded portions 44 are arranged in the staggered fashion so that the welded area on the side of the tooth and the welded area on the side of the core back side are equal to each other. Therefore, the occurrence of the cogging torque pulsation can be suppressed.

A plurality of welded portions 21*a* illustrated in FIG. 6 defines the first welded portions 21. A plurality of welded portions 22*a* defines the second welded portions 22. A plurality of welded portions 43*a* defines the third welded portions 43. A plurality of welded portions 44*a* defines the fourth welded portions 44.

In the example of FIG. 6, each of the plurality of welded portions 43*a* is positioned at the same level in the stacking direction as the corresponding one of the plurality of welded portions 22*a*.

Further, each of the plurality of welded portions 44*a* is positioned at the same level in the stacking direction as the corresponding one of the plurality of welded portions 21*a*.

The welds are provided as discussed above for the reasons set out below with reference to the welded portions 21*a* and the welded portions 44*a*.

Under the action of the welding contraction force on the welded portions 21*a*, each of the plurality of electromagnetic steel sheets on the side of the tooth end portion 30*b*2 is compressed in the stacking direction. At this time, each of the electromagnetic steel sheets of the core back 30*a* located closer to the second lateral face 60 than plane A warps, thereby forming a gap between the adjacent ones of the electromagnetic steel sheets. The presence of such a gap reduces the rigidity of the core piece 30 and deteriorates the magnetic characteristics of the core piece 30, thereby causing a reduction in the operation efficiency of the rotating electrical machine.

For the core piece 30 of the first embodiment, the welded portions 44*a* are arranged so as to cancel such a strain. This suppresses the formation of the gap between the electromagnetic steel sheets, thereby improving the magnetic characteristics. As a result, it is possible to suppress the reduction in the operation efficiency of the rotating electrical machine.

Further, since the formation of the gap generated between the electromagnetic steel sheets is suppressed, the reduction in the rigidity of the core piece 30 is suppressed, the roundness of the stator core 3 can be ensured during the operation of the rotating electrical machine, and the generation of vibration and noise can be suppressed.

Further, since the formation of the gap between the electromagnetic steel sheets is suppressed, the occurrence of cogging torque pulsation due to the reduction in the dimensional accuracy of the inner diameter of the stator core 3 is suppressed, and the occurrence of vibration and noise can be suppressed. Note that the reduction in the dimensional accuracy of the inner diameter of the stator core 3 means worsening the inner diameter of the annular stator core 3 defined by the annular combined core pieces 30 as the individual electromagnetic steel sheets are distorted in the stacking direction due to the welding.

Figure 7:
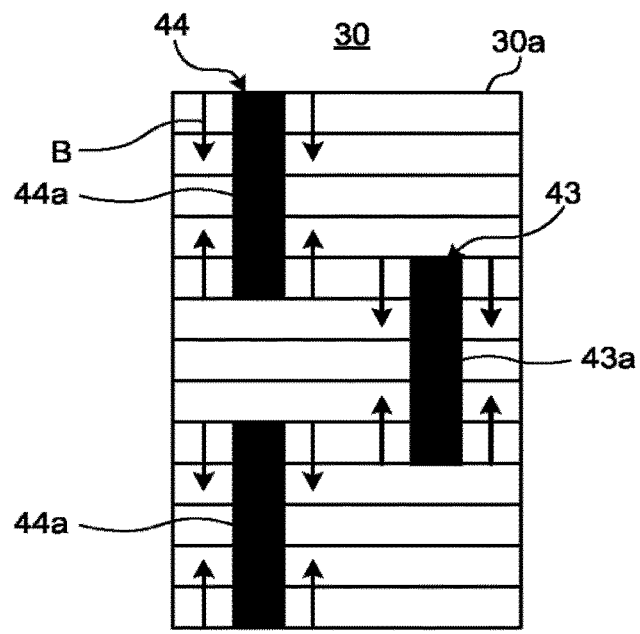
FIG. 7 is a diagram for explaining the welding contraction force acting on the welded portions in the rotating electrical machine according to the first embodiment.

FIG. 7 is a diagram for explaining the welding contraction force acting on the welded portions in the rotating electrical machine according to the first embodiment. FIG. 7 is an enlarged view of parts of the third welded portions 43 and the fourth welded portions 44 provided on the core back 50*a* of the core piece 30.

As schematically indicated by arrows B, the welding contraction force in the stacking direction is caused by cooling of the third welded portions 43 and the fourth welded portions 44.

As illustrated in FIG. 7, the third welded portions 43 and the fourth welded portions 44, which are provided only on the core back 30*a*, are distant from the rotor 2 by a large distance, as compared with the welds formed on the end face 10 of the tooth 30*b* illustrated in FIG. 5. The third welded portions 43 and the fourth welded portions 44 are thus less likely to be affected by the interlinkage magnetic flux generated in the rotor 2, thereby suppressing the eddy current loss.

Due to the welding contraction force generated in the welded portions 43*a* and the welded portions 44*a*, meantime, the plurality of electromagnetic steel sheets on the side of the core back 30*a* is compressed in the stacking direction. The individual electromagnetic steel sheet on the side of the non-welded tooth end portion 30*b*2 then warps, thereby forming a gap between the adjacent ones of the electromagnetic steel sheets.

For the core piece 30 of the first embodiment, the welding contraction force generated in the third welded portions 43 and the fourth welded portions 44 is offset by the welding contraction force generated in the first welded portions 21 and the second welded portions 22 illustrated in FIG. 5. Consequently, the formation of the gaps between the plural electromagnetic steel sheets on the side of the tooth end portion 30*b*2 can be suppressed.

Next, welding conditions will be described using FIGS. 8 and 9.

Figure 8:
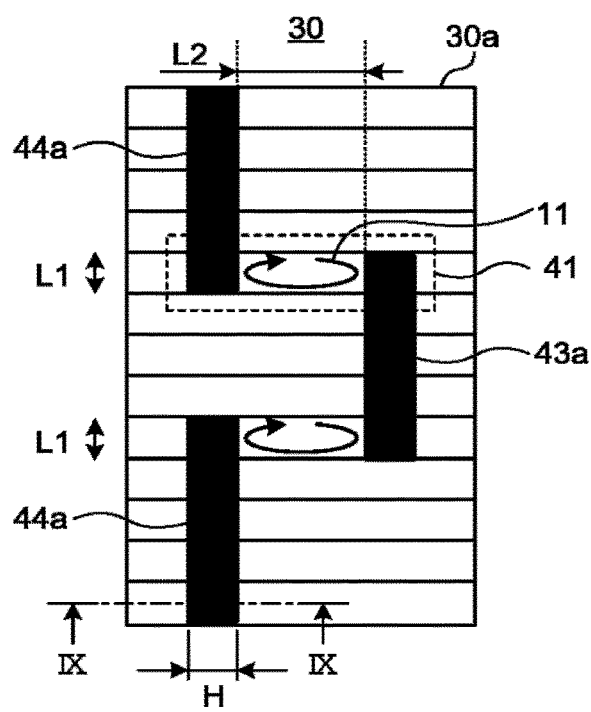
FIG. 8 is a diagram schematically illustrating a current loop generated in an overlapped portion of the welded portions in the rotating electrical machine according to the first embodiment.

FIG. 8 is a diagram schematically illustrating a current loop generated in an overlapped portion of the welded portions in the rotating electrical machine according to the first embodiment. FIG. 9 is a cross-sectional view taken along line IX-IX illustrated in FIG. 8.

FIG. 8 is an enlarged view of a part of the third welded portions 43 and the fourth welded portions 44 provided on the core back 30*a* of the core piece 30.

Reference character "41" indicates an overlapping portion overlapping the welded portion 43*a* and the welded portion 44*a* in the stacking direction.

The welded portion 44*a* has a width H in the direction orthogonal to the stacking direction. The width of the welded portion 43*a* is also defined similarly.

The welded portion 44a and the welded portion 43a have their overlapping lengths L1 in the stacking direction at the overlapping portion 41.

The distance between the welded portion 44a and the welded portion 43a, which are adjacent in the direction orthogonal to the stacking direction, is indicated by reference numeral L2.

Figure 9:
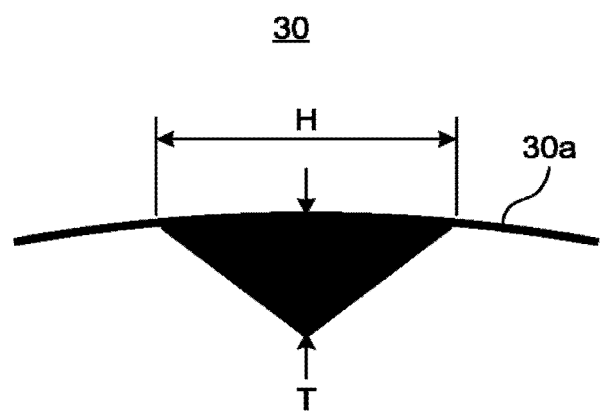
FIG. 9 is a cross-sectional view taken along line IX-IX illustrated in FIG. 8.

FIG. 9 illustrates the width H of the welded portion and a penetration depth T of the welded portion. The penetration depth T is the width of the welded portion extending from the outer peripheral face of the core back 30a to a certain extent toward the center of the stator core 3 illustrated in FIG. 2.

As illustrated in FIG. 8, in the overlapping portion 41 overlapping the welded portion 43a and the welded portion 44a, an eddy current 11 is generated by the interlinkage magnetic flux generated in the rotor 2, and an eddy current loss b is caused by the eddy current 11.

A relationship between the eddy current loss W, an area $S_1$ of the overlapping portion, a penetration area $S_2$, and the overlapping length L1 is expressed by Formula (1) below. The penetration area $S_2$ is obtained from the width H and penetration depth T of the welded portion illustrated in FIG. 9.

$$W \propto S1^2 \times S_2/L1 \tag{1}$$

A detailed description of Formula (1) is made below.

The eddy current loss W represents the eddy current loss generated in the welded portions 43a and 44a at the overlapping portion 41.

The eddy current loss W is expressed by Formula (2) below. Reference characters "I", "E", and "R" indicate current, voltage, and resistance, respectively.

$$w = i \times E = E^2/R \tag{2}$$

Since a voltage E is generated by the interlinkage magnetic flux, the voltage E can be expressed by $e \propto d\varphi/dt$ (Faraday's law of electromagnetic induction).

The magnetic flux p can be expressed by $\varphi = B \times S1$. Reference characters "B" and "$S_1$" indicate a magnetic flux density and the area of the overlapping portion, respectively.

The area of the overlapping portion $S_1$ is the area observed when the overlapping portion 41 illustrated in FIG. 0 is viewed in plan from the outer peripheral face of the core piece 30, and can be obtained by the product of the overlapping length L1 and the overlapping width L2 (the overlapping length L1×the overlapping width L2).

Therefore, there is a relationship of Formula (3) below between the voltage E and the area $S_1$ of the overlapping portion.

$$E \propto S_1 \tag{3}$$

In addition, a resistance R is the resistance of the welded portions at the overlapping portion. Since the value of resistance R is proportional to the length and inversely proportional to the area, there is a relationship of Formula (4) below between the resistance R, the overlapping length L1, and the penetration area $S_2$.

$$R \propto L1/S_2 \tag{4}$$

Formula 1) above is derived from Formulas (2) to (4) above.

Since Formula (1) indicates that the eddy current loss W is proportional to overlapped length L1, the eddy current loss W decreases as the overlapping length L1 decreases. Setting the overlapping length L1 to a size corresponding to a single electromagnetic steel sheet can reduce most the eddy current loss W generated in the overlapping portion 41.

For the core piece 30 of the first embodiment, the end portion of each of the plurality of first welded portions 21 in the stacking direction and the end portion of the corresponding one of the plurality of second welded portions 22 in the stacking direction overlap in the stacking direction by the thickness of one of the plurality of electromagnetic steel sheets. For the core piece 30 of the first embodiment, further, the end portion of each of the plurality of third welded portions 43 in the stacking direction and the end portion of the corresponding one of the plurality of fourth welded portions 44 in the stacking direction overlap in the stacking direction by the thickness of one of the plurality of electromagnetic steel sheets. This configuration reduces the eddy current loss generated in the overlapping portions overlapping the first welded portions 21 and the second welded portions 22, and reduces the eddy current loss generated in the overlapping portions of the third welded portions 43 and the fourth welded portions 44, whereby the further improvement in motor efficiency can be expected.

Here, if the welds each formed on the corresponding one of the electromagnetic steel sheets are to be arranged in the staggered manner, the number of times of the welding operations increases, and the core piece 30 has the lower mechanical rigidity with respect to its own weight as the axial length of the core piece 30 is larger. As a result, the problem of cracking of the welded portions during the transportation to the next process arises making the core piece 30 difficult to handle.

In order to prevent such a problem, it is necessary to adjust the length of the welded portion such that the strength of the welded portion is larger than the load applied to the welded portion.

The tensile strength P of the welded portion is expressed by Formula (5) below. Reference characters "A", "D", and "T" indicate the weld length, the tensile strength of the core piece 30, and the penetration depth, respectively. The weld length A is a length of a group of the welded portions arranged in the staggered fashion, which length is defined as a width from the one end of the group to the opposite end of the group in the stacking direction.

$$P = A \times D \times T \tag{5}$$

It can be seen from Formula (5) above that the tensile strength P of the welded portion is proportional to the length A of the welded portions. The core piece 30 according to the first embodiment should be manufactured meeting the conditions that tensile strength P is larger than the load applied to the welded portion and the overlapping length L1 is equal to the thickness of the single electromagnetic steel sheet. These manufacturing conditions can prevent the cracking of the welded portions during the transportation to thereby improve the productivity, as well as minimizing the occurrence of the eddy current loss W.

Note that it is possible to increase the strength of the welded portion by increasing the penetration depth T. As can be seen from Formula (1) above, unfortunately, the greater, the penetration depth T is, the greater the penetration area is, thereby increasing the eddy current loss W. It is thus desirable that penetration depth T be made as small as possible.

Modifications of the core piece 30 will be described below.

Figure 10:
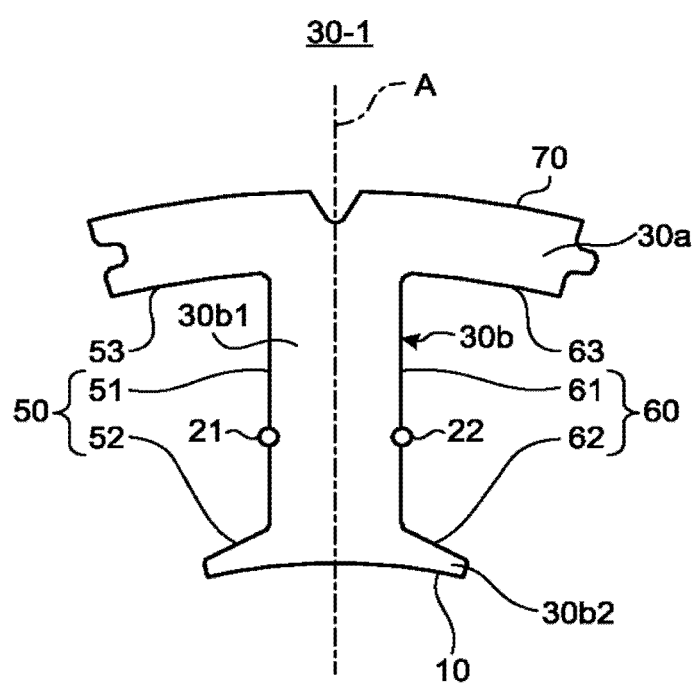
FIG. 10 is a view illustrating a first modification of the core piece illustrated in FIG. 5.

FIG. 10 is a view illustrating a first modification of the core piece illustrated in FIG. 5. The core piece of FIG. 10 differs from the core piece 30 illustrated in FIG. 5 in the locations of the first welded portions 21 and the second welded portions 22 and that the core piece of FIG. 10 lacks the third welded portions 43 and the fourth welded portions 44.

The first welded portions 21 are arranged on the lateral face 51 of the tooth base portion 30$b$1, and the second welded portions 22 are arranged on the same side as the lateral face 61 of the tooth base portion 30$b$1.

The lack of the third welded portions 43 and the fourth welded portions 44 can reduce the manufacturing cost of the core piece 30-1. For the core piece 30-1, the distance from the rotor 2 to the first welded portions 21 and the second welded portions 22 is so long that the first welded portions 21 and the second welded portions 22 are less likely to be affected by the interlinkage magnetic flux generated in the rotor 2. Thus, the eddy current loss can be further suppressed, and the further improvement in motor efficiency can be expected.

Figure 11:
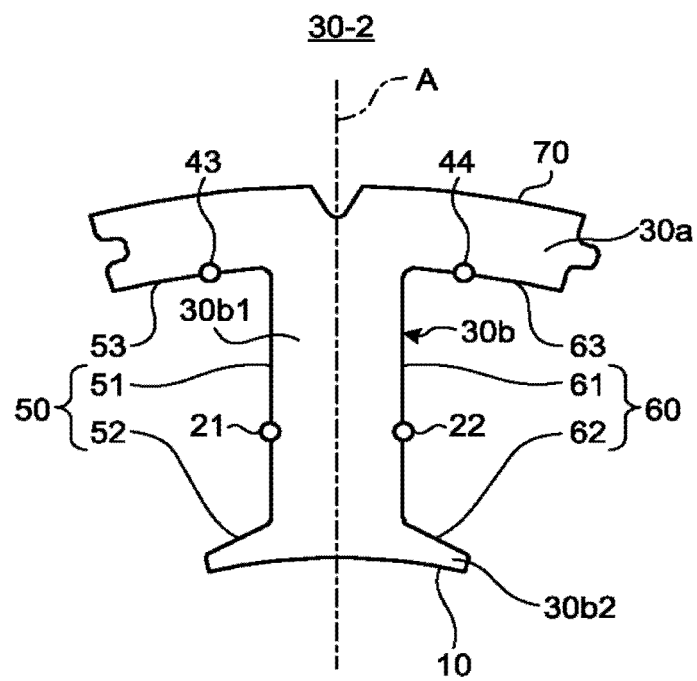
FIG. 11 is a view illustrating a second modification of the core piece illustrated in FIG. 5.

FIG. 11 is a view illustrating a second modification of the core niece illustrated in FIG. 5. The core piece of FIG. 11 differs from the core piece 30 illustrated in FIG. 5 in the locations of the third welded portions 43 and the fourth welded portions 44 and the locations of the first welded portions 21 and the second welded portions 22.

The third welded portions 43 of the core piece 30-2 are arranged on an inner side face 53 of the core back 30$a$ and arranged at intervals in the stacking direction. The inner side face 53 lies in a plane on which the tooth 30$b$ is disposed, and is located on the same side as the first lateral face 50 with respect to plane A.

The fourth welded portions 44 of the core piece 30-2 are arranged on an inner side face 63 of the core back 30$a$ and arranged at intervals in the stacking direction. The inner side face 63 lies in a plane on which the tooth 30$b$ is disposed, and is located on the same side as the second lateral face 60 with respect to plane A.

For the core piece 30-2, the distance from the rotor 2 to the first welded portions 21 and the second welded portions 22 is so long that the first welded portions 21 and the second welded portions 22 are less likely to be affected by the interlinkage magnetic flux generated in the rotor 2. Thus, the eddy current loss can be further suppressed, and the further improvement in motor efficiency can be expected.

The core piece 30-2 is configured such that the first welded portions 21 face the third welded portions 43 while the second welded portions 22 face the fourth welded portions 44. This arrangement of the first, second, third, and fourth welded portions suppresses the formation of the gaps generated between the electromagnetic steel sheets during the manufacturing of the core piece 30-2, as compared with the case where the first welded portions 21 and the second welded portions 22 are provided in the foregoing manner. Thus, the magnetic characteristics of the core piece 30-2 are improved, and the operation efficiency of the rotating electrical machine 100 can be improved.

The core piece 30-2 is configured such that the first welded portions 21 face the third welded portions 43 while the second welded portions 22 face the fourth welded portions 44. This arrangement of the first, second, third and fourth welded portions facilitates the welding operation, thereby shortening the manufacturing time for the core piece 30-2, as compared with the case where the third welded portions 43 and the fourth welded portions 44 are arranged on the outer side face 70 of the core back 30$a$.

Note that the third welded portions 43 and the fourth welded portions 44 illustrated in FIG. 11 may be arranged in the same way as the third welded portions 43 and the fourth welded portions 44 illustrated in FIG. 5. Specifically, each of the plurality of welded portions 43$a$ illustrated in FIG. 11 is positioned at the same level in the stacking direction as the corresponding one of the plurality of welded portions 22$a$. Further, each of the plurality of welded portions 44$a$ is positioned at the same level in the stacking direction as the corresponding one of the plurality of welded portions 21$a$. Providing the welded portions in this manner suppresses the above-mentioned warpage of the electromagnetic steel sheets to thereby suppress the formation of the gaps generated between the electromagnetic steel sheets, which results in the suppression of a reduction in the operation efficiency of the rotating electrical machine. Further, since the formation of the gaps generated between the electromagnetic steel sheets is suppressed, the occurrence of the cogging torque pulsation due to a reduction in the dimensional accuracy of the inner diameter of the stator core 3 is suppressed, thereby suppressing the occurrence of vibration and noise.

Figure 12:
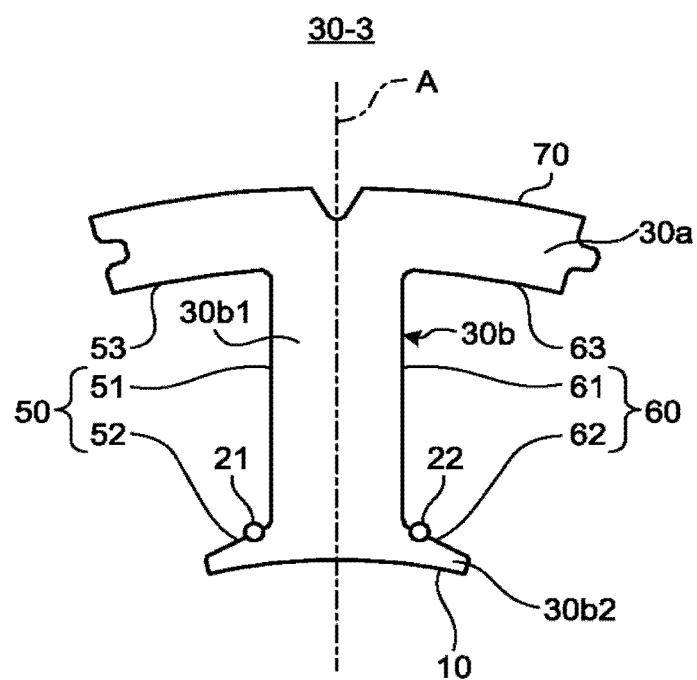
FIG. 12 is a view illustrating a third modification of the core piece illustrated in FIG. 5.

FIG. 12 is a view illustrating a third modification of the core piece illustrated in FIG. 5. The core piece of FIG. 12 differs from the core piece 30 illustrated in FIG. 5 in the locations of the first welded portions 21 and the second welded portions 22 and in that the core piece of FIG. 12 lacks the third welded portions 43 and the fourth welded portions 44.

The first welded portions 21 of the core piece 30-3 are arranged on the lateral face 52 of the tooth end portion 30$b$2.

The second welded portions 22 of the core piece 30-3 are arranged on the lateral face 62 of the tooth end portion 30$b$2.

For the core piece 30-3, the first welded portions 21 and the second welded portions 22 are provided so as to suppress the amount of strain at the electromagnetic steel sheets on the side of the tooth end portion 30$b$2. Therefore, the amount of strain at the tooth end portion 30$b$2 is suppressed, and the occurrence of the cogging torque pulsation due to the reduction in the dimensional accuracy of the inner diameter of the stator core 3 is suppressed. As a result, the occurrence of vibration and noise of the rotating electrical machine can be suppressed.

Second Embodiment

Figure 13:
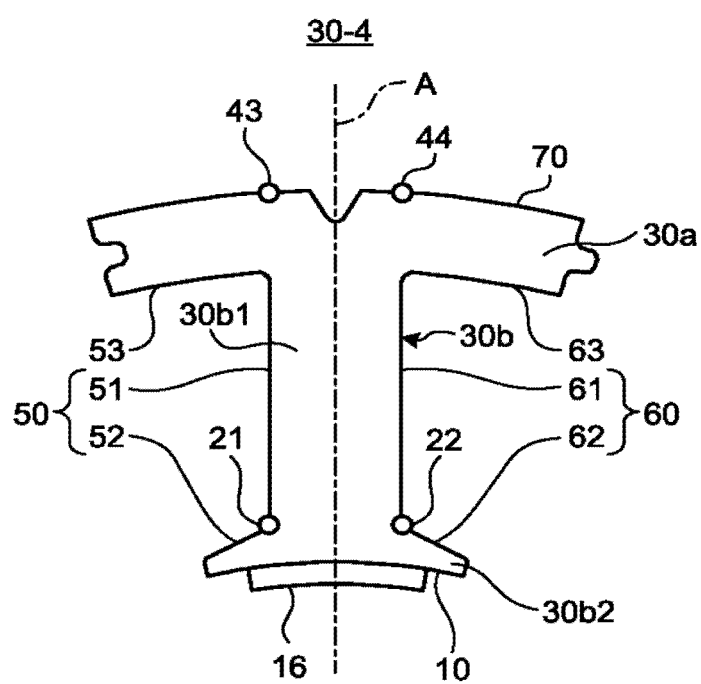
FIG. 13 is a view for explaining a method of manufacturing a rotating electrical machine according to a second embodiment.

FIG. 13 is a view for explaining a method of manufacturing a rotating electrical machine according to a second embodiment. FIG. 13 illustrates a core piece 30-4 equipped with a strain gauge 16 used in the method of manufacturing the rotating electrical machine according to the second embodiment. The core piece 30-4 has the same shape as the core piece 30 of the first embodiment.

The electromagnetic steel sheet, which is the core piece formed by die-punching a steel sheet base material, undergoes the deformation called sags and burrs. The sags and burrs also occur due to the sheet thickness deviation of steel sheet base materials. Due to the sacs and burrs, a gap is formed between the adjacent electromagnetic steel sheets in the group of the stacked electromagnetic steel sheets. Since the size of such a gap varies, the laser output from a welding machine would travel into the group of the electromagnetic steel sheets through these gaps when the group of the stacked electromagnetic steel sheets are welded together, which results in the variation in the amount of welding heat input varies and hence the variation in the penetration area.

Next, the relationship between the amount of welding heat input and the amount of contraction of the core piece 30-4 will be described.

The amount of contraction due to the thermal strain is proportional to the amount of welding heat input supplied from an energy source when the core piece 30-4 is welded using a welding machine. Adjustment of this amount of welding heat input makes it possible to control the amount of contraction of the tooth 30b.

As indicated by Formula below, the amount of contraction S depends on the amount of welding heat input Q (J/mm), the sheet thickness h (mm) of the tooth 30b, the coefficient of linear expansion α(J/g° C.), density ρ (g/mm³), and specific heat (J/g° C.) of the material.

$$S = \alpha Q / c \rho h \qquad (6)$$

It can be seen from Formula (6) above that the amount of contraction S is proportional to the amount of welding heat input Q. That is, if the penetration area varies due to the fluctuation the amount of welding heat input Q, the welding strain due to the welding also varies, thereby causing a reduction in the dimensional accuracy of the inner diameter of the stator core 3.

Next, the cogging torque will be described.

For a permanent magnet type rotating electrical machine including 10 poles and 12 slots, the cogging torque includes a component of the number of poles and a component of the number of slots. The component of the number of poles is the twelfth harmonic component and harmonic components of multiples of twelve of cogging torque, and the component of the number of slots is the tenth harmonic component and harmonic components of multiples of ten of cogging torque. The tenth harmonic component and harmonic components of multiples of ten of cogging torque come from the dimensional accuracy of the inner diameter of the stator core 3.

From the above, the variation in the amount of welding heat input Q cause the welding strain and the reduction in the dimensional accuracy of the inner diameter of the stator core 3, which worsens the cogging torque.

In order to solve such a problem, the method of manufacturing the rotating electrical machine according to the second embodiment includes the following steps.

(1) attaching the strain gauge 16 to the end face 10 of the tooth end portion 30b2 of the core piece 30-4.

(2) using the strain gauge 16 to measure the amount of strain on the side of the tooth end portion, which amount of strain comes from the welding on the core back side, and providing the first welded portions 21 and the second welded portions 22 in the staggered fashion with the amount of welding penetration being adjusted observing the amount of strain at the first lateral face 50 and the second lateral face 60 such that the measured amount of strain is offset. That is, the amount of welding heat input is controlled using the amount of strain measured by the strain gauge 16.

By thus controlling the amount of welding heat input, the welding strain can be suppressed, thereby improving the dimensional accuracy of the inner diameter of the stator core 3. This reduces the tenth harmonic component and harmonic components of multiples of ten of cogging torque, thereby reducing the total cogging torque. As a result, the rotating electrical machine can have the small torque pulsation.

Since the distance between the welded portions on the core back 30a, that is, the distance between each of the third welded portions 43 and the corresponding one of the fourth welded portions 44, does not depend on the loss, the same effect can be obtained by adjusting the distance between these welded portions to cancel the strain in the stacking direction on the inner diameter side of the core piece 30-4.

Further, the method of manufacturing the rotating electrical machine according to the second embodiment may include a step of arranging the first welded portions 21 and the second welded portions 22 in the staggered fashion in the stacking direction with the welding length of each of the welded portions being adjusted to make the tensile strength of the welded portion larger than the load applied to the welded portion. Consequently, it is possible to prevent the cracking of the welded portions during the transportation, thereby improving the productivity as well as minimizing the occurrence of the eddy current loss W.

The configuration described in the above-mentioned embodiments indicates an example of the contents of the present invention. The configuration can be combined with another well-known technique, and a part of the configuration can be omitted or changed in a range not departing from the gist of the present invention.

REFERENCE SIGNS LIST

1 stator; 2 rotor; 3 stator core; 4 winding; shaft; 6 permanent magnet; 7 gap; 10 end face; 11 eddy current; 16 strain gauge; 21 first welded portions; 21a, 22a, 43a, 44a welded portion; 22 second welded portions; 30, 30-1, 30-2, 30-3, 30-4 core piece; 30a core back; Sob tooth; 30b1 tooth base portion; 30b2 tooth end portion; 41 overlapped portion; 43 third welded portions; fourth welded portions; 50 first lateral face; 51, 52, 61, 62 lateral face; 53, 63 inner side face; 60 second lateral face; 70 outer side face; 100 rotating electrical machine.

The invention claimed is:

1. A rotating electrical machine comprising:
   a stator core including a plurality of stacked electromagnetic steel sheets, the stator core including a core back and a tooth protruding from the core back, wherein
   the tooth includes:
      a plurality of first welded portions arranged on a first lateral face of the tooth and arranged in a stacking direction of the plurality of electromagnetic steel sheets; and
      a plurality of second welded portions arranged on a second lateral face of the tooth and arranged in the stacking direction, and
   the plurality of first welded portions and the plurality of second welded portions are arranged in a staggered fashion in the stacking direction.

2. The rotating electrical machine according to claim 1, wherein
   the core back includes a plurality of third welded portions and a plurality of fourth welded portions arranged on an outer side face of the core back,
   the plurality of third welded portions is arranged on the same side as the first lateral face with respect to an imaginary plane extending in a direction in which the tooth protrudes, the imaginary plane equally dividing a width of the tooth, the third welded portions being arranged in the stacking direction,
   the plurality of fourth welded portions is arranged on the same side as the second lateral face with respect to the plane, the fourth welded portions being arranged in the stacking direction, and
   the plurality of third welded portions and the plurality of fourth welded portions are arranged in a staggered fashion in the stacking direction.

3. The rotating electrical machine according to claim 2, wherein
   each of the plurality of third welded portions is positioned at the same level in the stacking direction as a corresponding one of the plurality of second welded portions, and each of the plurality of fourth welded portions is positioned at the same level as a corresponding one of the plurality of first welded portions.

4. The rotating electrical machine according to claim 1, wherein
the core back includes a plurality of third welded portions and a plurality of fourth welded portions arranged on an inner side face of the core back,
the plurality of third welded portions is arranged on the same side as the first lateral face with respect to an imaginary plane extending in a direction in which the tooth protrudes, the imaginary plane equally dividing a width of the tooth, the third welded portions being arranged in the stacking direction,
the plurality of fourth welded portions is arranged on the same side as the second lateral face with respect to the plane, the fourth welded portions being arranged in the stacking direction, and
the plurality of third welded portions and the plurality of fourth welded portions are arranged in a staggered fashion in the stacking direction.

5. The rotating electrical machine according to claim 4, wherein
each of the plurality of third welded portions is positioned at the same level in the stacking direction as a corresponding one of the plurality of second welded portions, and
each of the plurality of fourth welded portions is positioned at the same level as a corresponding one of the plurality of first welded portions.

6. The rotating electrical machine according to claim 1, wherein
the tooth includes a tooth base portion protruding from the core back and a tooth end portion provided at an end of the tooth,
the first lateral face includes a first lateral face of the tooth base portion and a first lateral face of the tooth end portion,
the second lateral face includes a second lateral face of the tooth base portion and a second lateral face of the tooth end portion,
the plurality of first welded portions is arranged on the first lateral face of the tooth end portion, and
the plurality of second welded portions is arranged on the second lateral face of the tooth end portion.

7. The rotating electrical machine according to claim 1, wherein
the tooth includes a tooth base portion protruding from the core back and a tooth end portion provided at an end of the tooth,
the first lateral face includes a first lateral face of the tooth base portion and a first lateral face of the tooth end portion,
the second lateral face includes a second lateral face of the tooth base portion and a second lateral face of the tooth end portion,
the plurality of first welded portions is arranged on the first lateral face of the tooth base portion, and
the plurality of second welded portions is arranged on the second lateral face of the tooth base portion.

8. The rotating electrical machine according to claim 1, wherein
the tooth includes a tooth base portion protruding from the core back and a tooth end portion provided at an end of the tooth,
the first lateral face includes a first lateral face of the tooth base portion and a first lateral face of the tooth end portion,
the second lateral face includes a second lateral face of the tooth base portion and a second lateral face of the tooth end portion,
the plurality of first welded portions is arranged at a boundary between the first lateral face of the tooth base portion and the first lateral face of the tooth end portion, and
the plurality of second welded portions is arranged at a boundary between the second lateral face of the tooth base portion and the second lateral face of the tooth end portion.

9. The rotating electrical machine according to claim 1, wherein
an end portion of each of the plurality of first welded portions in the stacking direction and an end portion of a corresponding one of the plurality of second welded portions in the stacking direction overlap in the stacking direction by a thickness of three or less of the plurality of electromagnetic steel sheets.

10. A method of manufacturing a rotating electrical machine including a stator core including a plurality of stacked electromagnetic steel sheets, the stator core including a core back and a tooth protruding from the core back, the method comprising:
a step of arranging a plurality of first welded portions and a plurality of second welded portions in a staggered fashion in a stacking direction of the plurality of electromagnetic steel sheets with a welding length of each of the welded portions being adjusted to make a tensile strength of the welded portion larger than a load applied to the welded portion, the plurality of first welded portions being arranged on a first lateral face of the tooth and arranged in the stacking direction, the plurality of second welded portions being arranged on a second lateral face of the tooth and arranged in the stacking direction.

11. A method of manufacturing a rotating electrical machine including a stator core including a plurality of stacked electromagnetic steel sheets, the stator core including a core back and a tooth protruding from the core back, the method comprising:
a step of attaching a strain gauge to an end portion of the tooth; and
a step of arranging a plurality of first welded portions and a plurality of second welded portions in a staggered fashion in a stacking direction of the plurality of electromagnetic steel sheets with an amount of welding penetration being adjusted observing an amount of strain at a first lateral face of the tooth and a second lateral face of the tooth such that an amount of strain on a side of the core back is offset, the plurality of first welded portions being arranged on the first lateral face and arranged in the stacking direction, the plurality of second welded portions being arranged on the second lateral face and arranged in the stacking direction.

* * * * *